(12) United States Patent
Xu

(10) Patent No.: US 11,904,262 B2
(45) Date of Patent: Feb. 20, 2024

(54) VAPOR-LIQUID CONTACTING APPARATUS AND PROCESS WITH CROSS CONTACTING

(71) Applicant: UOP LLC, Des Plaines, IL (US)

(72) Inventor: Zhanping Xu, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 407 days.

(21) Appl. No.: 15/940,832

(22) Filed: Mar. 29, 2018

(65) Prior Publication Data

US 2019/0299119 A1  Oct. 3, 2019

(51) Int. Cl.
| | | |
|---|---|---|
| *B01D 3/32* | (2006.01) | |
| *B01D 1/30* | (2006.01) | |
| *B01J 19/32* | (2006.01) | |
| *B01D 3/28* | (2006.01) | |

(52) U.S. Cl.
CPC ............. *B01D 3/324* (2013.01); *B01D 1/305* (2013.01); *B01D 3/28* (2013.01); *B01J 19/32* (2013.01); *B01J 2219/322* (2013.01)

(58) Field of Classification Search
CPC .......... B01D 3/324; B01D 1/305; B01D 3/28; B01D 3/008; B01J 19/32; B01J 2219/322
See application file for complete search history.

(56) References Cited

U.S. PATENT DOCUMENTS

| | | | |
|---|---|---|---|
| 4,051,206 A * | 9/1977 | Bunas ...................... | B01D 3/22 |
| | | | 261/109 |
| 4,295,937 A | 10/1981 | Mayer et al. | |
| 5,730,843 A | 3/1998 | Groten et al. | |
| 5,837,105 A | 11/1998 | Stober et al. | |
| 6,287,367 B1 * | 9/2001 | Buchanan ................ | B01D 3/20 |
| | | | 261/113 |
| 6,715,741 B2 | 4/2004 | Xu et al. | |
| 6,739,585 B1 | 5/2004 | Urbanski et al. | |
| 7,424,999 B2 | 9/2008 | Xu et al. | |
| 8,020,838 B2 | 9/2011 | Heldwein et al. | |
| 2004/0097756 A1 | 5/2004 | Thiel et al. | |
| 2005/0223890 A1 | 10/2005 | Matsuura | |
| 2007/0137482 A1 * | 6/2007 | Xu ......................... | B01D 1/305 |
| | | | 95/198 |

(Continued)

FOREIGN PATENT DOCUMENTS

| | | |
|---|---|---|
| CN | 1681569 A | 10/2005 |
| CN | 101143266 A | 3/2008 |

(Continued)

OTHER PUBLICATIONS

International Search Report from PCT Application No. PCT/US2019/024475, dated Jul. 11, 2019.

(Continued)

*Primary Examiner* — Stephen Hobson

(57) ABSTRACT

A high capacity and high efficiency co-current and cross-flow vapor-liquid contacting apparatus and process is useful in distillation columns and other vapor-liquid contacting processes. The apparatus is characterized by an arrangement of contacting modules and perforated receiving pans in horizontal stages. The modules define a co-current contacting volume and in an exemplary configuration the modules include a liquid distributor and a demister. Liquid dispensed from the modules on a perforated receiving pan are contacted with upflowing vapor through perforations therein.

15 Claims, 5 Drawing Sheets

(56) References Cited

U.S. PATENT DOCUMENTS

| | | | |
|---|---|---|---|
| 2010/0162890 A1 | 7/2010 | Xu | |
| 2010/0162891 A1* | 7/2010 | Xu | B01D 3/26 |
| | | | 95/262 |
| 2010/0163397 A1 | 7/2010 | Xu et al. | |
| 2010/0242730 A1 | 9/2010 | Heldwein et al. | |
| 2011/0303089 A1* | 12/2011 | Xu | B01D 3/324 |
| | | | 95/213 |
| 2013/0062792 A1 | 3/2013 | Xu et al. | |
| 2015/0136582 A1* | 5/2015 | Takeyama | B01D 3/324 |
| | | | 202/161 |
| 2015/0352464 A1 | 12/2015 | Glüer et al. | |
| 2016/0151722 A1 | 6/2016 | Wehrli et al. | |

FOREIGN PATENT DOCUMENTS

| | | | |
|---|---|---|---|
| CN | 102271798 A | 12/2011 | |
| EP | 0016429 A2 | 10/1980 | |
| GB | 0505962 | 9/2005 | |
| GB | 0505962 A | 9/2005 | |
| GB | 2412334 A | 9/2005 | |
| WO | 2010019669 A2 | 2/2010 | |

OTHER PUBLICATIONS

Written Opinion from corresponding PCT application No. PCT/US2019/024475, dated Jun. 26, 2019.
International Preliminary Report on Patentability from PCT Application No. PCT/US2019/024475, dated Sep. 29, 2020.
Extended European Search Report from corresponding European application No. 19776929.2, dated May 26, 2021.

\* cited by examiner

VAPOR-LIQUID CONTACTING APPARATUS AND PROCESS WITH CROSS CONTACTING

FIELD

The field is vapor-liquid contacting for mass and/or heat transfer. The field specifically relates to a process and apparatus providing a high capacity fractionation useful in fractional distillation columns to separate volatile chemicals such as hydrocarbons.

BACKGROUND

Vapor-liquid contacting devices, such as fractionation trays and packings, are employed to perform an almost endless variety of separations in the petroleum and petrochemical industries. Fractionation trays are used, for example, in the separation of many different hydrocarbons such as paraffins, aromatics and olefins. Trays are used to separate specific compounds such as different alcohols, ethers, alkylaromatics, monomers, solvents, inorganic compounds, atmospheric gases, etc. and in the separation of broad boiling mixtures such as petroleum derived fractions including crude oil, naphtha, and LPG. Vapor-liquid contacting trays are also used to perform gas processing, purification, and absorption. A wide variety of trays and other contacting devices having differing advantages and disadvantages has been developed.

Fractionation trays and packings are the predominant form of conventional fractional distillation apparatus. They are widely used in the chemical, petrochemical and petroleum refining industries to promote vapor-liquid contacting performed in fractionation columns. The normal configuration of a fractionation column includes about 10 to 250 individual trays. Often the structure of each tray in the column is similar, but it is also known that the structures may alternate on vertically adjacent trays. Trays are mounted horizontally, typically at uniform vertical distances referred to as the tray spacing of the column. This distance may vary within different sections of the column. The trays are often supported by a ring welded to the inner surface of the column.

During the fractional distillation process using conventional trays, vapor generated at a lower location in the column rises through liquid spread over the decking area of the tray. The passage of the vapor through the liquid generates a layer of bubbles referred to as froth. The high surface area of the froth helps to quickly establish a compositional equilibrium between the vapor and liquid phases on the tray. The froth is then allowed to separate into vapor and liquid. During mass transfer, the vapor loses less volatile material to the liquid and thus becomes slightly more volatile as it passes upward through each tray. Simultaneously the concentration of less volatile compounds in the liquid increases as the liquid moves downward from tray to tray. The liquid separates from the froth and travels downward to the next lower tray. This continuous froth formation and vapor-liquid separation is performed on each tray. Vapor-liquid contactors therefore perform the two functions of contacting the rising vapor with liquid and then allowing the two phases to separate and flow in different directions. When the steps are performed a suitable number of times on different trays, the process leads to separation of chemical compounds based upon their relative volatility.

Many different types of vapor-liquid contacting devices including packing and trays have been developed as a result of the desire to improve equipment having this utility in the petroleum refining, chemical, and petrochemical industries. Different apparatuses tend to have different advantages. For instance, multiple downcomer trays have high vapor and liquid capacities and the ability to function effectively over a significant range of operating rates. Structured packing tends to have a low pressure drop making it useful in low pressure or vacuum operations. Two very important characteristics of vapor-liquid contacting equipment in which improvement is always sought are capacity and efficiency.

Fractional distillation has traditionally been conducted in cross flow or counter current contacting devices having an overall downward liquid flow and an upward vapor flow. At some point in the apparatus the vapor and liquid phases are brought into contact to allow the vapor and liquid phases to exchange components and approach equilibrium with each other. The vapor and liquid are then separated, moved in the appropriate direction and contacted again with another quantity of the appropriate fluid. In many vapor-liquid contacting devices, vapor and liquid may be contacted in a cross flow arrangement at each stage. An alternative apparatus differs from traditional multi-stage contacting systems in that while the overall flow in the apparatus continues to be countercurrent, each stage of actual contacting between the liquid and vapor phases is performed in a co-current mass transfer zone. A co-current contacting device can also achieve high mass transfer efficiency through the co-current contacting of fine liquid droplets with vapor. A co-current vapor-liquid contacting apparatus may have contacting channels that discharge vapor and liquid into separation chambers in a module. Vapor flows upward from the separation chambers to the contacting channel of the next higher module and liquid flows down through a liquid distributor to the next lower contacting channel.

SUMMARY

A high capacity and high efficiency co-current and cross-flow vapor-liquid contacting apparatus and process is useful in distillation columns and other vapor-liquid contacting processes. The apparatus is characterized by an arrangement of contacting modules and perforated receiving pans in horizontal stages. The modules define a co-current contacting volume and in an exemplary configuration the modules include a liquid distributor and a demister. Liquid dispensed from the modules on a perforated receiving pan are contacted with upflowing vapor through perforations therein.

DETAILED DESCRIPTION

Figure 1:
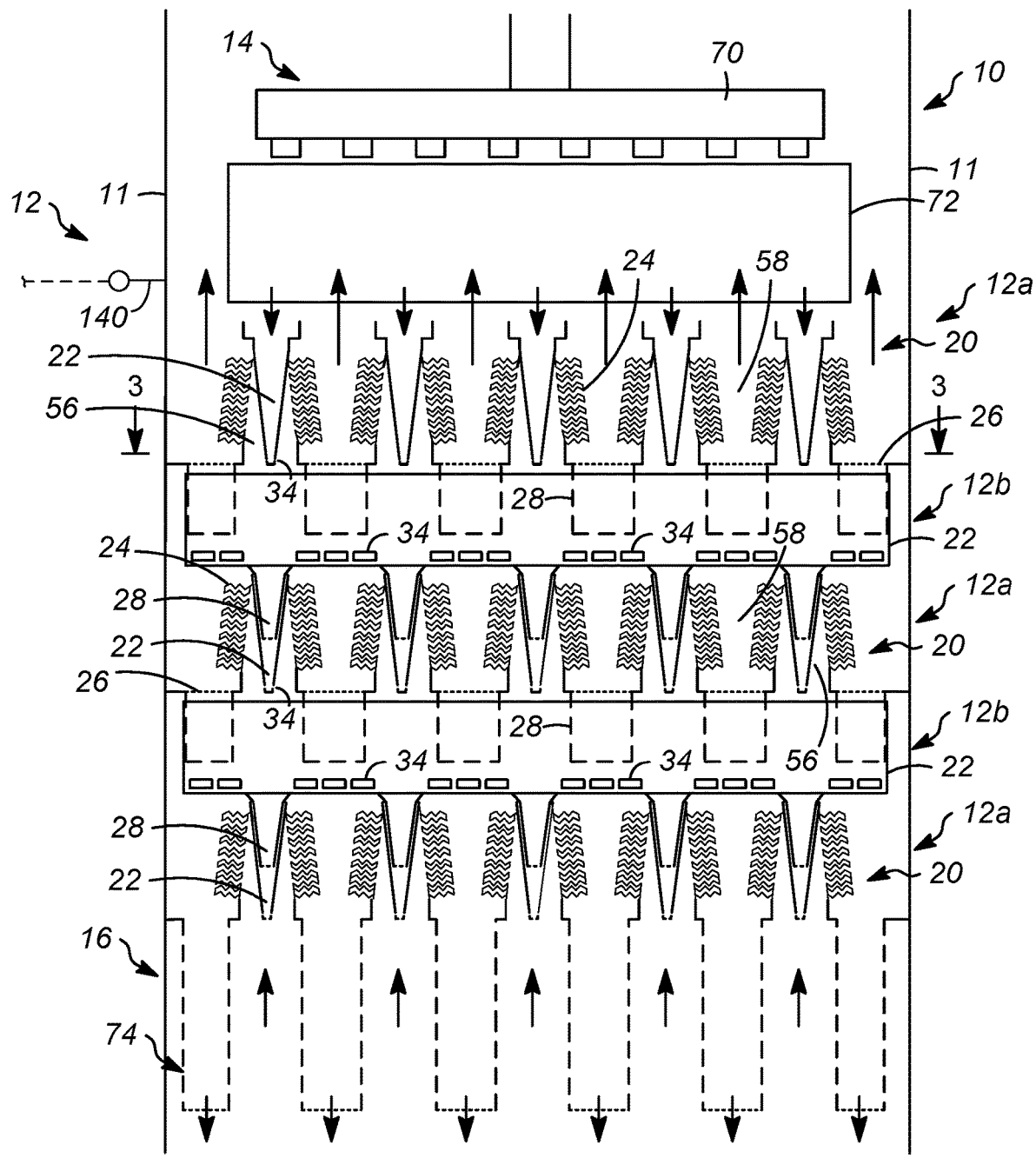
FIG. 1 is a cross-sectional schematic of a vapor-liquid contacting column employing contacting modules of the present invention.

Referring to FIG. 1, there is shown an embodiment of a vapor-liquid contacting apparatus within a vessel 10. The vessel 10 may be for example a distillation column, absorber, direct contact heat exchanger, separator or other vessel used to conduct vapor-liquid contacting. The vessel 10 contains at least one section of contacting stages 12 and optional collector/distributors above and below the section. An upper portion of the section may contain a top collector/distributor 14 and a lower portion of the section may contain a bottom collector/distributor 16. For simplicity, only five contacting stages 12a, 12b are shown. As is well known in the art, a distillation column may contain several sections. Each section may contain numerous contacting stages, and there may be a plurality of fluid feeds and/or withdraws between and/or within sections. Also, different contacting devices may be mixed in the same and/or different sections of the same column. Devices such as chimney trays and liquid distributors may be used in the space between sections for the feeds, withdrawals, and fluid collection and redistribution. The vessel 10 includes an outer shell 11 that is typically in the form of a cylinder, or, alternatively, any other shape. Vapor travel is represented in FIG. 1 by upwardly directed arrows and liquid travel is represented by downwardly directed arrows.

In the present embodiment, shown in the FIG. 1, each contacting stage 12a, 12b is oriented with a 90° rotation with respect to the directly superior and inferior stages. Thus, each contacting stage 12 distributes liquid in a direction that is orthogonal to the immediately inferior stage which reduces maldistribution of the liquid across the column cross section. In other embodiments, vertically adjacent contacting stages may be oriented with a rotation of between 0° and 90°. In further embodiments, the contacting stages are rotated between 9° and 90°. The degree of rotation between contacting stages may be the same at every stage or it can vary. That is, the degree of rotation between vertically adjacent contacting stages 12a, 12b may vary. In the illustrated embodiment, each contacting stage 12 comprises a plurality of contacting modules 20 and receiving pans 26. In FIG. 1, superior contacting stage 12a comprises every other contacting stage 12 and is oriented orthogonally to inferior contacting stage 12b.

Figure 2:
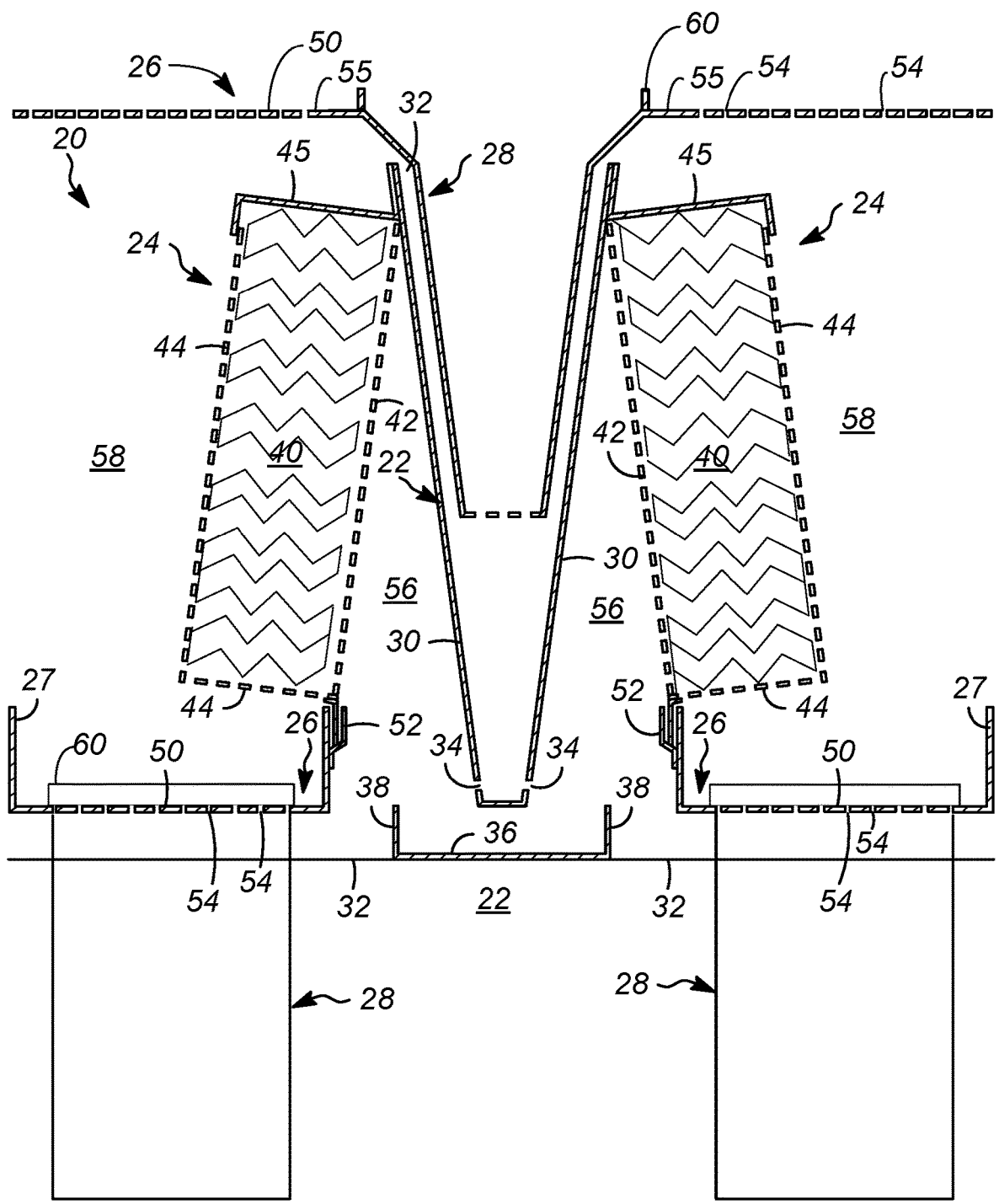
FIG. 2 is a cross-sectional schematic of a module of FIG. 1 taken at segment 2-2 in FIG. 3.

As shown in FIG. 2, each contacting module 20 includes a liquid distributor 22 located adjacent a demister 24 and preferably between a pair of demisters 24. A co-current fluid contacting volume 56 is provided between each liquid distributor 22 and an adjacent demister 24. In addition to the contacting modules 20, each contacting stage 12 also includes a plurality of receiving pans 26 below a respective demister 24. Each receiving pan 26 may be provided with a plurality of ducts 28. The receiving pan 26 has a base 50 that includes perforations 54 to allow vapor to rise therethrough and contact liquid on the pan 26.

Figure 3:
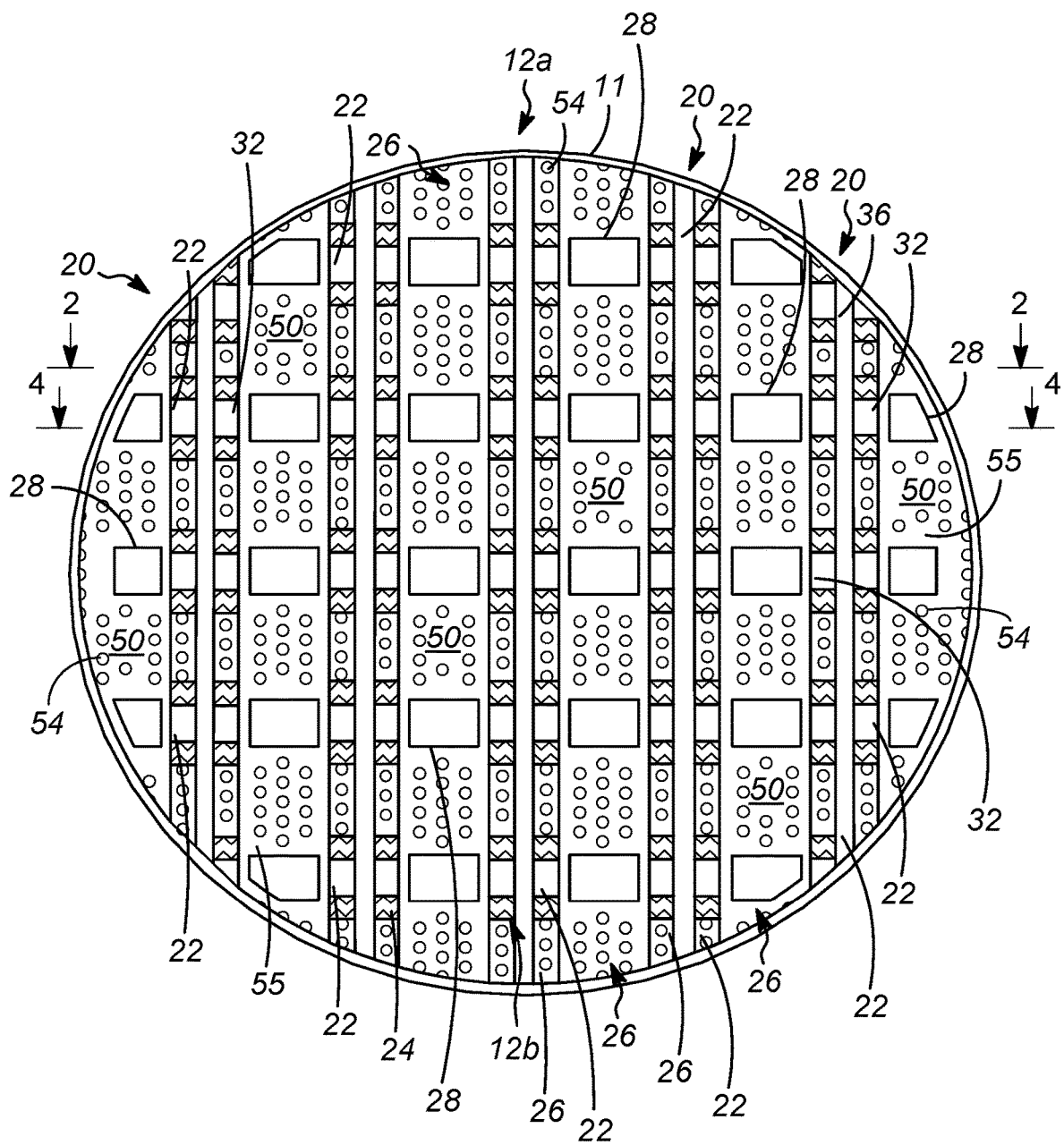
FIG. 3 is a top sectional view of a stage of the column of FIG. 1 taken at 3-3 showing the receiving pans and the liquid distributors.

FIG. 3 illustrates a sectional view of segment 3-3 of FIG. 1 clearly showing the arrangement of receiving pans 26, ducts 28, and liquid distributors 22 of a contacting module 20. The receiving pans 26, ducts 28, and liquid distributors 22 of a superior contacting stage 12a is shown most prominently in FIG. 3. Demisters 24 and receiving pans 26 of an inferior contacting stage 12b can also be observed below the superior contacting stage, although obscured by a bottom portion of a liquid distributor 22 of the superior contacting stage which dips into the segment 3-3 of FIG. 1. The contact modules 20 comprise demisters 24 that run along the length of liquid distributor 22 in rows, perhaps on either side of the liquid distributor.

At each contacting stage 12, the receiving pans 26 are substantially parallel and are spaced apart across the cross sectional area of the vessel 10. Bases 50 of the receiving pans 26 are equipped with perforations 54 such as sieve holes, valves or bubble caps to allow vapor to bubble up through the liquid in the pan. The liquid distributor 22 is located between a pair of adjacent receiving pans 26 resulting in an alternating pattern of receiving pans 26 and modules 20. Optional calm areas 55 in the receiving pans 26 immediately adjacent the ducts 28 may be imperforate to minimize vapor being entrained into the ducts.

Turning back to FIG. 2, the liquid distributor 22 of the present embodiment has an inlet 32 in an upper portion and a plurality of outlets 34 in a lower portion. The inferior liquid distributor 22 is shown extending parallel with the page in FIG. 2 to illustrate that it is turned ninety degrees with respect to the superior liquid distributor 22 which is shown extending orthogonal to the page. Two sloped liquid distributor walls 30 taper the liquid distributor 22 inwardly in a downward direction. The bottom of the substantially V-shaped liquid distributor may be pointed or curved or may be flat as shown in FIG. 2. Alternative embodiments having liquid distributors of various different shapes, such as stepped or sloped and stepped, may be envisioned. However, the V-shaped liquid distributor is used in the present embodiment to provide a combination of a large elongated contacting volume between the demisters 24 and liquid distributor walls 30 in the lower portion of each stage 12 and a large liquid distributor inlet 32 in the upper portion of the liquid distributor 22 for accommodating enlarged ducts 28 to increase liquid handling capability. The liquid distributor inlet 32 is configured to receive the ducts 28. It is envisioned that ducts 28 could simply be openings in the receiving pans 26, and the liquid distributor 28 extend upwardly to the duct as long as openings are fashioned to allow vapor to escape the top of the liquid distributor Optional inlet plates 36 are located between vertically adjacent liquid distributors 22. Liquid distributor inlet plates 36 cover the liquid distributor inlet below the liquid distributor outlets 34 of a superior liquid distributor 22. Two lips 38 on each inlet plate 36 impede liquid from entering into the inferior liquid distributor 22 and direct the liquid away toward the open contact volume 56 where the liquid is entrained upwardly by rising vapor from an inferior stage. Higher efficiency is ensured by preventing liquid from entering the liquid distributor 22 directly from the outlets 34 of a superior liquid distributor which would present a by-pass vapor-contacting opportunity.

The liquid distributor outlets 34 are formed by a plurality of slots or other types of perforations arranged in one or more rows proximate to the bottom of the liquid distributor 22. The liquid distributor outlets 34 may also be formed by punching the distributor wall 30 without removing the punched material to form directional slots or louvers for directing outlet liquid upward into the contacting volume to minimize liquid weeping to the inferior liquid distributor without passing through the contact volume 56 and demister 40. The outlets 34 may be located in the walls 30 and/or the bottom of the liquid distributor 22. In operation, a liquid level in the liquid distributor 22 provides a seal to prevent the ascending vapor from entering the liquid distributor through the outlets 34. The perforations 34 are preferably distributed along the length of the liquid distributor 22 and they may be arranged such that the perforations are varied in size or number or eliminated in the portions of the liquid distributor 22 that are directly above an orthogonal or angled inferior liquid distributor. Thus, arrangement of the liquid distributor outlets may be used as another means to prevent liquid from flowing directly from one liquid distributor into an inferior liquid distributor.

Figure 5A:
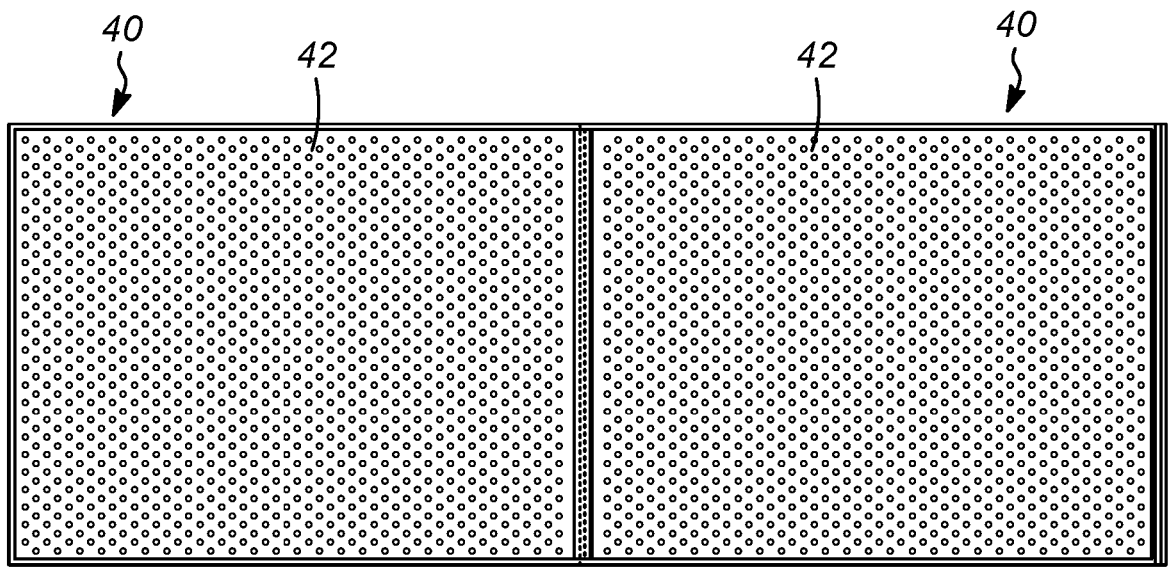
FIGS. 5A and 5B are elevational and sectional views of the demisters of FIG. 1, respectively.
Figure 5B:
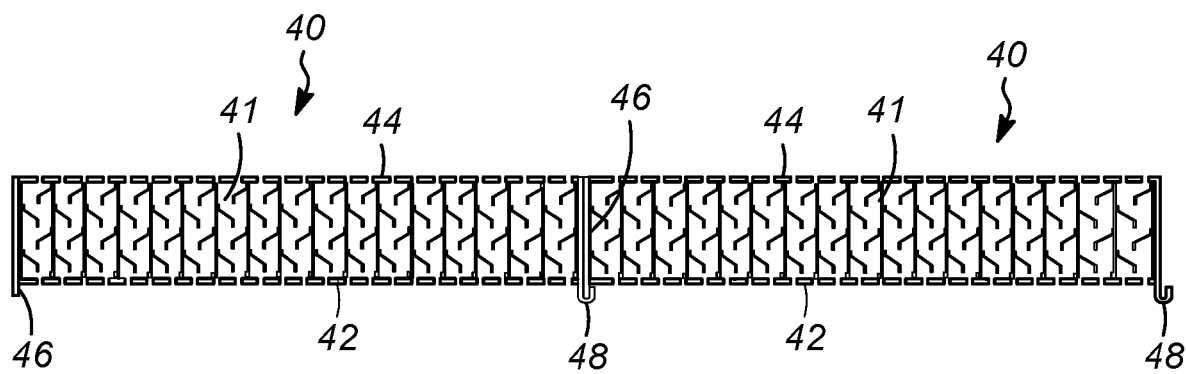

The demister 24 may be assembled from a plurality of demister units 40 shown in FIGS. 5A and 5B. FIG. 5A illustrates the perforated surface 42 of the demister unit 40. The demister units 40 may further include a male end plate 46 and a female end plate 48, each of which cooperates with complimentary end plate of an adjacent demister unit 40 to form a seal that substantially prevents fluid leakage through the junction. Such male and female end plates represent one type of interlocking mechanism that may be used to construct a demister 24 from modular demister units 40. Any known interlocking mechanism may be used. In other embodiments the modular units 40 may be fastened together by other known means such as using bolts, clips, pins, clamps, bands, or welding, or gluing. Mechanisms such as a male and female tab and slot combination can provide advantages for quick assembly and disassembly. The modular configuration of the demister 24 allows a fabricator to produce demister units 40 in one or a small number of standard sizes to be assembled into demisters 24 of varying length. Some custom-sized demister units 40 may be required for a particularly short demister 24 or to match the length of a liquid distributor 22 depending on the dimensions of the apparatus and the variety of standard size demister units 40 available. The modular design has the further advantage of easing the assembly of the contacting module 20 since the demister units 40 are lighter than a demister row formed of a single unit. However, in other embodiments a single demister unit 40 defines a complete demister 24.

The demister units 40 comprise a vapor-liquid separation structure 41. Various designs are used to de-entrain liquid droplets from a vapor stream. One example is mist eliminators, such as a vane type demister which have various channels and louvers such that the fluid stream passing through the demister must undergo several changes in direction which cause the entrained liquid droplets to impact portions of the separation structure 41 and flow downward to the bottom of the demister. Another example of known vapor-liquid separation devices are mesh pads or woven threads. Combinations of these mist eliminator technologies can also be used. Examples of suitable demister units 40 are provided in U.S. Pat. No. 7,424,999.

As shown in FIG. 2, various optional elements may cooperate with and/or be incorporated into the demister to further improve the performance and/or structural integrity of the apparatus. For example, a perforated inlet plate 42 as an inlet surface, a perforated outlet plate 44 as an outlet surface, and an imperforate top plate 45 are shown. Perforated plates are one type of flow manipulator that may cooperate with the demister. Other non-limiting examples of flow manipulators include expanded metal, porous solids, mesh pads, screens, grids, mesh, profile wire screens, and honeycombs. It has been found that the fractional open area of the flow manipulators affect both separation efficiency and pressure drop of the demister. The fractional open area of the flow manipulators may vary on different sides and on the same side of the demister to optimize the separation efficiency and pressure drop of the demister. Various types of flow manipulators may be used in a single demister. In other embodiments, flow manipulators are not used on some or any of the inlet and outlet surfaces of the demister.

The perforated inlet plate 42 is proximate the liquid distributor 22. The perforated outlet plate 44 extends the majority of the demister side opposite to the perforated inlet plate 42 and along the bottom of the demister unit 40. The imperforate top plate 45 prevents liquid from leaving the demister unit 40 directly from the top of the unit and increases the vapor-liquid separation efficiency. The imperforate top plate 45 has bent strips on both sides, one following liquid distributor wall 30 for attaching with the wall and the other following the perforated outlet plate 44 of the demister 40 for connecting with the perforated outlet plate 44. It has been found that the imperforate strip extending down a distance from the top of the perforated outlet plate 44 also improves vapor-liquid separation efficiency. In one embodiment, the strip extends to cover about 10% of the height of the demister outlet. In another embodiment the strip extends to about 30% of the height of the demister outlet. In a further embodiment the strip extends to about 50% of the height of the demister outlet.

Each of the receiving pans 26 includes vertically extending lips 27 around the flat perforated base 50. The lips 27 may be formed with the same plate as base 50 and may be perforated to allow vapor flow therethrough. Demister support rails 52 are formed by attaching a formed metal plate to each of the two lips along the longitude of the receiving pan 26. Terminal receiving pans 26 may include only one demister support rail 52. The liquid collected in the receiving pan 26 is directed to the plurality of ducts 28 and liquid distributors 22. The support rails 52 engage the base of the demister units 40 in a particular demister 24. A support flange attached to the bottom of each demister unit 40 is inserted into the support rail 52, and the top of the demister is fastened to the liquid distributor wall 30, proximate to the liquid distributor inlet 32. The support rails 52 provide structural support for the demister units 40 even before the demister units 40 have been fastened to the liquid distributor 22. In this embodiment, each central receiving pan supports two demister rows 24, one from each of two adjacent contacting modules 20, while the terminal receiving pans that are proximate to the vessel shell 11 support one demister row of the terminal modules of the stage. Thus, a single receiving pan 26 may be shared by two contacting modules 20. Thus, as described for the present embodiment of the invention, the construction of each stage may be the same in at least part of a column, which simplifies the fabrication and installation of the apparatus.

As shown in FIG. 3, the plurality of ducts 28 extend through the receiving pan 26 into the liquid distributor inlet 32. Each of the ducts 28 that extends through a particular receiving pan 26 directs liquid into a different inferior liquid distributor 22. In one embodiment, the top of the duct 28 is flush with the perforated base 50 of the receiving pan 26, so that liquid may flow freely from the receiving pan 26 into the duct 28 without any obstruction.

In another embodiment shown in FIG. 2, a weir 60 around a top of the duct 28 extending above the base 50 of the perforated receiving pan 26 holds a desired liquid level on the pan. The receiving pans 26 equipped with the weir 60 around the duct 28 increase liquid holdup on pans and improve vapor-liquid contact and increasing mass transfer efficiency.

Figure 4:
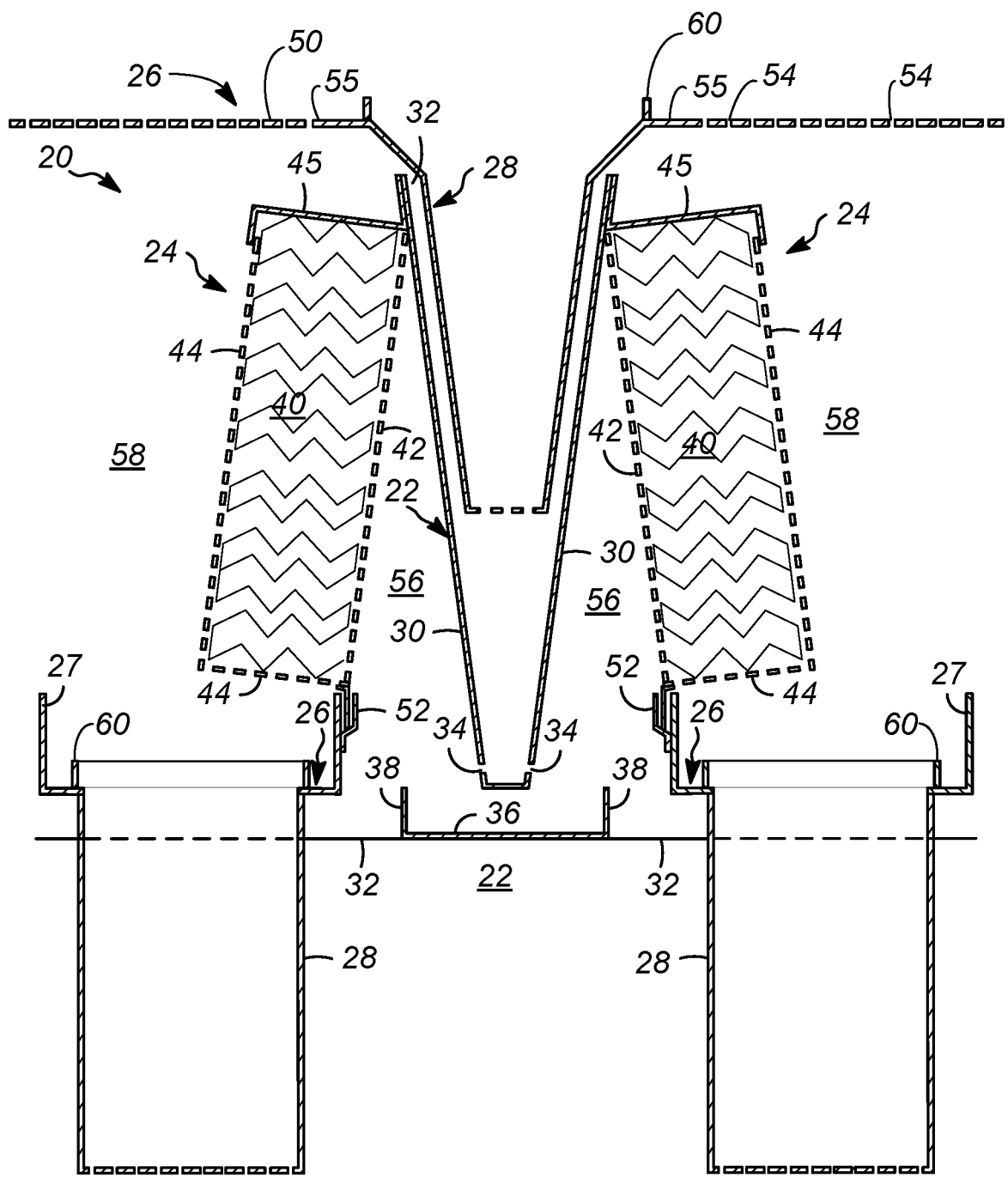
FIG. 4 is a sectional view of a module taken through the duct 28 at segment 4-4 in FIG. 3.

As FIG. 2 is a sectional view taken through the receiving pan 26 at segment 2-2 in FIG. 3, FIG. 4 is a sectional view taken through the duct 28 at segment 4-4 in FIG. 3. The top mouth of the duct 28 may be enlarged and wider than liquid distributor inlet 32 as shown in FIG. 2 to increase liquid handling capability and reduce choking tendency at the duct inlet. The sidewalls of the ducts 28 are sloped, so that the ducts 28 fit within the liquid distributors 22 and leave a gap for easy installation and vapor venting. Vapor may enter into the liquid distributor 22 with liquid flow from a superior stage or through liquid distributor outlets 34 when the outlets are not completely sealed by the liquid in the liquid distributor 22. If the vapor in the liquid distributor 22 is not properly vented from the liquid distributor inlet 32, it will be forced into ducts 28, which may choke the liquid flow through the ducts and cause severe entrainment and premature flooding of the apparatus. Therefore, it is an advantage of the present embodiment that the vapor in the liquid distributor 22 is vented through the liquid distributor inlets 32 in the gaps between ducts 28 and the liquid distributor 22 or openings at the top of the liquid distributor 22 between ducts 28. The bottom of the duct 28 is opened with plurality of spouts or one continuous slot or single larger opening to allow liquid to flow into the liquid distributor 22. Under normal operating conditions, the ducts 28 are sealed against vapor flow either dynamically by liquid in the ducts 28 or statically by liquid in the liquid distributor 22.

The volume between the inlet surface 42 of a demister 24 and the adjacent wall 30 of the liquid distributor 22 provides a fluid contacting volume 56. The fluid contacting continues in the demisters units 40 before vapor and liquid are separated. The perforated plate 42 or other flow manipulator at the demister inlet improves fluid flow distribution to the demister and improves vapor-liquid separation. The inlet flow manipulator may also improve fluid contacting and mass transfer. The volume above a receiving pan 26 and between the demister rows 24 that it supports defines a fluid transfer volume 58. The demister 24 may be oriented at an angle from vertical as illustrated in FIG. 2 to provide a contacting volume 56, which, in the present embodiment, has a decreasing volume from bottom to top to match with the decreased fluid flow and a fluid transfer volume 58, which, in the present embodiment, has an increasing volume from bottom to top to match with the increasing vapor flow. Due to perforations in the receiving pans 26, vapor-liquid cross-contacting occurs in the fluid transfer volume 58.

The liquid distributors 22 and the receiving pans 26 may be supported by support rings, not shown, which are affixed to the inner surface of the column shell 11 such as by welding or other conventional means. Additional beams may be required for supporting the pans 26 and demisters 24. The liquid distributors 22 and the receiving pans 26 may be bolted, clamped, or otherwise secured to the support ring so that the liquid distributors 22 and the receiving pans 26 are kept in position during operation. In a particular embodiment, the end of the liquid distributor 22 includes an end seal welded to the end of the liquid distributor 22 to thereby seal the end of the liquid distributor 22. Further, strengthening features such as ribs, braces, increased material thickness, and additional supports may be used with the liquid distributors 22 and the receiving pans 26. The ends of the liquid distributors 22 may be configured in a variety of ways to follow the contour of the vessel shell.

In some embodiments one or more collector/distributors may be employed. Such devices are not required, but they provide an advantage by properly directing the vapor and/or liquid flows to maximize the vapor-liquid contacting and separation in each stage of the apparatus. For example, the top collector/distributor 14 is shown in FIG. 1 and includes a pipe distributor 70 and a trough distributor 72. The pipe distributor 70 and trough distributor 72 direct liquid into the liquid distributors 22 of the top contacting stage 12. The top collector/distributor 14 also reclaims vapor exiting from the demister rows 24 of the top stage 12. The reclaimed vapor may be passed to a subsequent process or to a condenser to be reintroduced to the column in part as a reflux liquid. Without the top collector/distributor or other equivalent means, downward flowing liquid could flow into the fluid transfer volumes 58 and thus be entrained back to above the top stage or by-pass the top stage vapor-liquid contacting volumes depending on vapor velocity in the fluid transfer volumes 58. Such liquid flow may also disrupt the upward vapor flow and cause inefficiencies in one or more inferior contacting stages.

The ducts 74 of the bottom stage discharge liquid to the column sump. The vapor may be distributed between the ducts 74 rather than below them to reduce vapor-liquid contacting and entrainment. The reclaimed liquid in the column sump may be communicated to a subsequent process or to a reboiler to be reintroduced to the column in part as a vapor. The ducts 74 on the bottom stage may be designed differently than the rest of the stages. For example, one continuous duct 74 may be used in place of a plurality of ducts 74 under a receiving pan 26. Alternatively, ducts are installed near the ends of the receiving pan 26 leaving most of the middle space below the bottom stage 12 empty for vapor flow. The openings on the receiving pan 26 are modified accordingly. The ducts 74 of the bottom stage may also be connected to the liquid distributors 22 instead of receiving pans 26 for directing liquid directly from the liquid distributors to the column sump. In this case, no vapor-liquid contacting occur in the bottom stage, and the bottom stage is used mainly for de-entrainment in case the entrainment from up-flow vapor is high. In addition to the top and bottom collector/distributors discussed above, additional collector/distributors may provide a benefit at any point in the column at which a fluid stream is being introduced or withdrawn such as the one or more feed streams and/or any other product streams such as side cuts. A chimney tray with liquid distributors and vapor risers may be used in the column for fluid introduction/distribution/withdraw or where there is a significant change in the design of the vapor-liquid contacting devices such as between two column sections.

The stage 12 at the transition from one section to another includes features to enable proper fluid flow between the non-parallel sections. The ends of the contacting module 20 that is, the terminal portions of the module 20 which face the inner surface of the shell 11 of the enclosing vessel 10, may be sealed to prevent unintended vapor or liquid bypassing of the contacting apparatus. In this embodiment, the ends of the module 20 are tapered or curved to conform to the curvature of the enclosing structure. Alternately, the ends of the modules 20 are flat and a horizontal imperforate extension plate spans the gap from the module 20 to the enclosing vessel wall.

With reference to FIG. 1, the fluid flow of a contacting module 20 of a contacting stage 12 will be described hereinafter. The liquid from a superior stage 12 by several superior receiving pans 26 through the ducts 28 or a collector/distributor 14 is directed into a liquid distributor 22. The liquid exits the liquid distributor 22 through liquid distributor outlets 34 and enters the fluid contacting volume 56. The upward vapor velocity at the inlet of the fluid contacting volume 56 is so high that the liquid entering the contacting volume 56 is entrained upwardly by the vapor. As shown in FIG. 2, the inlet plate 36 on an inferior liquid distributor 22 prevents the short circuit of liquid flow from a superior liquid distributor to the inferior liquid distributor without vapor contact. The entrained liquid is carried upwardly by the vapor into the inlet surfaces 42 of the demisters 24. The vapor and liquid are separated by the separating structures 41, as shown in FIG. 5B, within the demister units 40 and the vapor exits the demister units 40 through the outlet surface 44 into the fluid transfer volume 58.

Referring to FIGS. 1 and 2, the vapor out of the demisters 24 mixes with the vapor in the transfer volume 58 and then continues upward to a contacting volume 56 in a superior contacting module 20 or a receiving pan 26 of a superior contacting stage 12. Shown best in FIG. 2, the liquid exits the demister units 40 through the bottom portion of the outlet surface 44 and flows onto the receiving pan 26. The receiving pan 26 directs the liquid into the plurality of ducts 28, each of which ducts 28 direct the liquid into a different inferior liquid distributor 22. Moreover, liquid on the receiving pans 26 is also cross-contacted with vapor ascending through perforations 54 in the receiving pans.

Operating conditions for a fractionation column are confined by the physical properties of the compounds being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the subject process therefore include a temperature in the broad range of from about −50° C. to about 400° C. The column is operated at a pressure sufficient to maintain at least a portion of the feed compounds present as a liquid. The perforations 54 in the base 50 of the receiving pans promote cross-flow vapor liquid contacting which enables the spacing between modules 20 while still effecting vapor-liquid contacting. Consequently, fewer modules 20 may be installed on a contacting stage 12 resulting in substantial cost savings. With the reduced number of modules 20 and the additional vapor-liquid contacting on receiving pans 26, the mass transfer efficiency of each stage is increased.

Any of the above lines, conduits, units, devices, vessels, surrounding environments, zones or similar equipment collectively understood as process equipment may be equipped with one or more monitoring components including sensors, measurement devices, data capture devices or data transmission devices. A sensor 140 which communicates with the vessel 10 is shown in FIG. 1. The sensor 140 senses a parameter such as a condition in the vessel 10 and transmits data such as a signal to a receiver (not shown). Signals, process or status measurements, and data from monitoring components may be used to monitor conditions in, around, and on the process equipment. Signals, measurements, and/or data generated or recorded by monitoring components may be collected, processed, and/or transmitted to the receiver through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to a receiver that may comprise one or more computing devices or systems. Computing devices or systems may include at least one processor and memory storing computer-executable instructions including readable instructions that, when executed by the at least one processor, cause the one or more computing devices to perform a process that may include one or more steps. For example, the one or more computing devices may be configured to receive, from one or more monitoring component, data related to at least one piece of process equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is an apparatus for performing co-current and cross-flow vapor-liquid contacting, comprising a plurality of stages each having at least one contacting module and at least one receiving pan, the contacting module comprising; a liquid distributor having an outlet proximate to a contacting volume and a demister having an inlet surface proximate to the contacting volume and an outlet surface superior to the receiving pan; and the receiving pan having a perforated base, the receiving pan inferior to the outlet surface of the demister. An embodiment of the invention is one, any or all of prior embodiments in this paragraph up through the first embodiment in this paragraph further comprising at least one duct in fluid communication with the receiving pan and with an inferior liquid distributor. An embodiment of the invention is one, any or all of prior embodiments in this paragraph up through the first embodiment in this paragraph wherein the duct is separate from the liquid distributor and the duct having an upper end in fluid communication with the receiving pan, and a lower end, wherein the lower end of each duct is in fluid communication with a separate inferior liquid distributor. An embodiment of the invention is one, any or all of prior embodiments in this paragraph up through the first embodiment in this paragraph further comprising a contacting volume between the demister and the liquid distributor and the liquid distributor has an outlet in fluid communication with the contacting volume and the inlet surface of the demister is in fluid communication with the contacting volume. An embodiment of the invention is one, any or all of prior embodiments in this paragraph up through the first embodiment in this paragraph wherein vapor enters the receiving pan through perforations in the base and liquid exits the receiving pan though the duct. An embodiment of the invention is one, any or all of prior embodiments in this paragraph up through the first embodiment in this paragraph further comprising a weir adjacent to the duct extending above the base of the receiving pan for holding up liquid on the receiving pan. An embodiment of the invention is one, any or all of prior embodiments in this paragraph up through the first embodiment in this paragraph further comprising a calm area around the ducts in the receiving pan that is imperforate. An embodiment of the invention is one, any or all of prior embodiments in this paragraph up through the first embodiment in this paragraph further comprising a pair of demisters being spaced apart and the liquid distributor located between the pair of demisters. An embodiment of the invention is one, any or all of prior embodiments in this paragraph up through the first embodiment in this paragraph wherein the receiving pan is located downstream of the contacting module for liquid flow on a stage. An embodiment of the invention is one, any or all of prior embodiments in this paragraph up through the first embodiment in this paragraph wherein the contacting module of at least one of the stages is rotated with respect to the contacting module of another one of the stages.

A second embodiment of the invention is an apparatus for performing co-current and cross flow vapor-liquid contacting, comprising a plurality of stages, having at least one contacting module and a receiving pan, the contacting module comprising a demister; a liquid distributor located adjacent the demister and providing a contacting volume therebetween and the liquid distributor having an outlet in fluid communication with the contacting volume; and the demister having an inlet surface in fluid communicating with the contacting volume and an outlet surface superior to the receiving pan of the stage; and the receiving pan located adjacent the contacting module, the receiving pan comprising a perforate base and having at least one duct in fluid communication with an inferior liquid distributor. An embodiment of the invention is one, any or all of prior embodiments in this paragraph up through the second embodiment in this paragraph wherein the receiving pan is located downstream of the contacting module for liquid flow on a stage. An embodiment of the invention is one, any or all of prior embodiments in this paragraph up through the second embodiment in this paragraph wherein the liquid distributor, the demister and the receiving pan each extend substantially along the length of the module. An embodiment of the invention is one, any or all of prior embodiments in this paragraph up through the second embodiment in this paragraph further comprising a contacting volume between the demister and the liquid distributor and the liquid distributor has an outlet in fluid communication with the contacting volume and the inlet surface of the demister is in fluid communication with the contacting volume. An embodiment of the invention is one, any or all of prior embodiments in this paragraph up through the second embodiment in this paragraph wherein vapor enters the receiving pan through perforations in the base and liquid exits the receiving pan though the duct. An embodiment of the invention is one, any or all of prior embodiments in this paragraph up through the second embodiment in this paragraph further comprising a weir adjacent to the duct to retain liquid on the receiving pan. An embodiment of the invention is one, any or all of prior embodiments in this paragraph up through the second embodiment in this paragraph further comprising a calm area around the ducts in the receiving pan that is imperforate. An embodiment of the invention is one, any or all of prior embodiments in this paragraph up through the second embodiment in this paragraph further comprising at least one of a processor; a memory storing computer-executable instructions; a sensor positioned at a location to sense at least one parameter; and a receiver configured to receive data from the sensor.

A third embodiment of the invention is a process for vapor-liquid contacting, comprising the steps of passing vapor upwardly into a contacting volume; directing liquid through an outlet of a first liquid distributor into the contacting volume; entraining the liquid in the vapor to flow co-currently into a demister; separating the liquid from the vapor in the demister; delivering a separated liquid stream exiting the demister to a perforated receiving pan; and passing a second vapor stream up through perforations in the receiving pan into cross-contact with the separated liquid stream passing a separated vapor stream from the demister and from the receiving pan to a superior contacting volume and a perforated base of a superior receiving pan. An embodiment of the invention is one, any or all of prior embodiments in this paragraph up through the third embodiment in this paragraph further comprising contacting liquid on the receiving pan with the vapor passing up through perforations and separating the liquid from the vapor above the receiving pan before vapor enters into the superior contacting volume and a perforated base of a superior receiving pan. An embodiment of the invention is one, any or all of prior embodiments in this paragraph up through the third embodiment in this paragraph further comprising passing the liquid from the receiving pan through at least one duct that directs the liquid into an inferior liquid distributor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for performing co-current and cross-flow vapor-liquid contacting, comprising:
   a plurality of stages each having at least one contacting module and at least one receiving pan;
   the at least one contacting module comprising a liquid distributor having an outlet proximate to a contacting volume and a demister having an inlet surface proximate to the contacting volume and an outlet surface superior to the at least one receiving pan;
   the at least one receiving pan having a flat perforated base, the at least one receiving pan of the stage downstream of said outlet surface of the demister for collecting liquid from the demister, wherein there is a liquid flow path though the contacting volume, the demister, and the receiving pan in series, and wherein there is a vapor flow path through the contacting volume in parallel with a vapor flow path through the receiving pan; and
   at least one duct in fluid communication with the at least one receiving pan and with an inferior liquid distributor;
   wherein the at least one receiving pan includes vertically extending perforated lips around the flat perforated base.

2. The apparatus of claim 1 wherein the at least one duct is separate from the liquid distributor and the at least one duct having an upper end in fluid communication with the at least one receiving pan, and a lower end, wherein the lower end of each duct is in fluid communication with a separate inferior liquid distributor.

3. The apparatus of claim 1 wherein the contacting volume is between the demister and the liquid distributor and said outlet of the liquid distributor is in fluid communication with the contacting volume and the inlet surface of the demister is in fluid communication with the contacting volume.

4. The apparatus of claim 1 wherein vapor enters the at least one receiving pan through perforations in the base and liquid exits the at least one receiving pan though the at least one duct.

5. The apparatus of claim 1 further comprising a weir adjacent to the at least one duct extending above the base of the at least one receiving pan for holding up liquid on the at least one receiving pan.

6. The apparatus of claim 1 further comprising an area around the at least one duct in the at least one receiving pan that is imperforate.

7. The apparatus of claim 1 further comprising a pair of demisters being spaced apart and said liquid distributor located between said pair of demisters.

8. The apparatus of claim 1 wherein the at least one receiving pan is located downstream of the at least one contacting module for liquid flow on a stage.

9. The apparatus of claim 1 wherein the at least one contacting module of at least one of said stages is rotated with respect to the at least one contacting module of another one of said stages.

10. An apparatus for performing co-current and cross flow vapor-liquid contacting, comprising:
  a plurality of stages, having at least one contacting module and a receiving pan, the at least one contacting module comprising:
  a demister;
  a liquid distributor located adjacent the demister and providing a contacting volume therebetween and the liquid distributor having an outlet in fluid communication with the contacting volume; and
  the demister having an inlet surface in fluid communication with the contacting volume and an outlet surface upstream of the receiving pan of the stage for collecting liquid from the demister, wherein there is a liquid flow path though the contacting volume, the demister, and the receiving pan in series, and wherein there is a vapor flow path through the contacting volume in parallel with a vapor flow path through the receiving pan; and
  the receiving pan located adjacent the at least one contacting module, the receiving pan comprising a flat perforate base and having at least one duct in fluid communication with an inferior liquid distributor;
  wherein the receiving pan includes vertically extending perforated lips around the flat perforated base.

11. The apparatus of claim 10 wherein the receiving pan is located downstream of the at least one contacting module for liquid flow on a stage.

12. The apparatus of claim 10 wherein the liquid distributor, the demister and the receiving pan each extend substantially along the length of the at least one contacting module.

13. The apparatus of claim 12 further comprising a weir adjacent to the at least one duct to retain liquid on the receiving pan.

14. The apparatus of claim 10 wherein vapor enters the receiving pan through perforations in the base and liquid exits the receiving pan though the at least one duct.

15. The apparatus of claim 10, further comprising at least one of:
  a processor;
  a memory storing computer-executable instructions;
  a monitoring component positioned at a location to sense at least one parameter; and
  a receiver configured to receive data from the monitoring component.

* * * * *